United States Patent [19]

Roberts

[11] 4,142,215
[45] Feb. 27, 1979

[54] TAPE DRIVE TESTER

[75] Inventor: Clyde D. Roberts, Sapulpa, Okla.

[73] Assignee: The Telex Corporation, Tulsa, Okla.

[21] Appl. No.: 857,011

[22] Filed: Dec. 2, 1977

[51] Int. Cl.$^2$ .......................... G11B 27/36; G11B 5/09
[52] U.S. Cl. .......................................... 360/31; 360/45
[58] Field of Search ............................ 360/31, 45, 53

[56] References Cited

U.S. PATENT DOCUMENTS

| 2,737,646 | 3/1956 | Muttly | 360/31 |
| 3,031,525 | 4/1962 | Oniki | 360/31 |
| 3,947,875 | 3/1976 | Bull et al. | 360/31 |
| 4,009,490 | 2/1977 | Fassbender | 360/45 |

Primary Examiner—Vincent P. Canney
Attorney, Agent, or Firm—Head, Johnson & Chafin

[57] ABSTRACT

A portable tester for testing tape drive units, which provides means for generating a selective repetitive composite data pattern, which includes a direct pattern and a reverse pattern which is an inverted image of the direct pattern, and writing the composite pattern on tape. Means are provided for reading the composite pattern off the tape and providing a read signal which is the result of amplifying and differentiating the signal from the read head. Means are provided for applying this read signal to an oscilloscope in a conventional manner, and to trigger the sweep of the oscilloscope at a selected time in advance of a critical portion of the read signal, for each of the direct and reverse patterns. Thus, an analog pattern signal will be displayed on the oscilloscope screen for the critical parts of both the direct and reverse portions of the pattern, for tape movement both direct and reverse. Changes may be made in the adjustment of the tape drive unit which might affect the waveform peak shift and of the analog signal, and the changes in waveform peak shift can be immediately observed on the display.

4 Claims, 6 Drawing Figures

TAPE DRIVE TESTER

BACKGROUND OF THE INVENTION

1. Field of the Invention

This invention lies in the field of magnetic tape drive units. More particularly, it concerns the design of a portable tester that may be used in the shop, or in the field, for testing magnetic tape drive units.

2. Description of the Prior Art

In the prior art, the majority of tape drive testers do not provide a method of directly evaluating peak shift, nor do they provide a method of evaluating peak shift or analog waveform under various data patterns. Normal shop procedure in adjusting a tape unit is to:

1. adjust the tape drive circuits observing analog wave forms using a tester that generates a continuous square wave signal equivalent to the output of a signal generator;
2. after adjustment in this manner, the tape drive is run on its controller in the random data mode to check for errors. If this step is judged acceptable;
3. the controller and tape drive are run on the central processor for final acceptance of the error rate on the tape drive.

If either step 2 or step 3 is not acceptable, then step 1 must be repeated, or alternately, the controller is used as a tester while the drive is being adjusted.

This is a costly process because of the expensive equipment that is tied up, or at least partially tied up, during the adjustment process. This can be put in proper perspective when it is realized that each controller typically has four to 16 tape drives attached, all of which may be rendered inoperative, from the central processor's point of view, when step 2 is being performed.

This invention is directed to eliminating the trial and error approach, described above, in testing the tape drive units.

SUMMARY OF THE INVENTION

It is a primary object of this invention to provide a tester which can provide a selected pattern signal to be recorded on tape and to be read from tape and displayed, in order to determine whether the peak shift is greater than a selected value. Furthermore, the pattern signal is repetitively being applied to the tape and read and observed, the necessary adjustments are made on the tape drive unit, in order to vary the peak shift in such a manner as to reduce the peak shift to a minimum value that will be acceptable.

It is a further object of this invention to provide a field tester and one or more selected programs or data patterns which are diagnostic of the peak shift of the write/read system and to provide means for displaying the read signal from the tape in order to determine what the peak shift is and to evaluate the change in peak shift, made by the adjustments available on the tape unit.

These and other objects are realized and the limitations of the prior art is overcome in this invention by providing a practical portable field apparatus, which comprises a number of read only memories, each of which has a selected data pattern, each pattern is a composite pattern, in which the diagnostic pattern is presented in a direct polarity and then in a reverse or complementary polarity. After recording this composite pattern on the tape, it is read off the tape. The signal from the read head is amplified and differentiated, to provide a read signal, which is displayed on an oscilloscope. The triggering of the sweep on the oscilloscope is precise, in relation to a specific time in the direct and reversed patterns, so that the read signal provides an analog pattern which is displayed on the scope and simultaneously viewed, so that both the direct and the reversed diagnostic signal can be observed simultaneously.

In addition to displaying the direct and reversed diagnostic read signal, the zero axis crossing times of the read signal are determined and displayed simultaneously for the direct and reverse signals, providing a total of four traces on the oscilloscope. By this means the shape of the analog signal can be viewed and the precise amount of peak shift can be determined. Thus, while the patterns are continuously displayed adjustments can be made to the tape unit, which are provided by the manufacturer for reducing peak shift. The overall effect of these adjustments can be determined immediately while the adjustment is being made so that it can be determined when the peak shift is minimum, or at a good compromise between analog waveform and peak shift. At that time the adjustment is complete and the test is complete.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
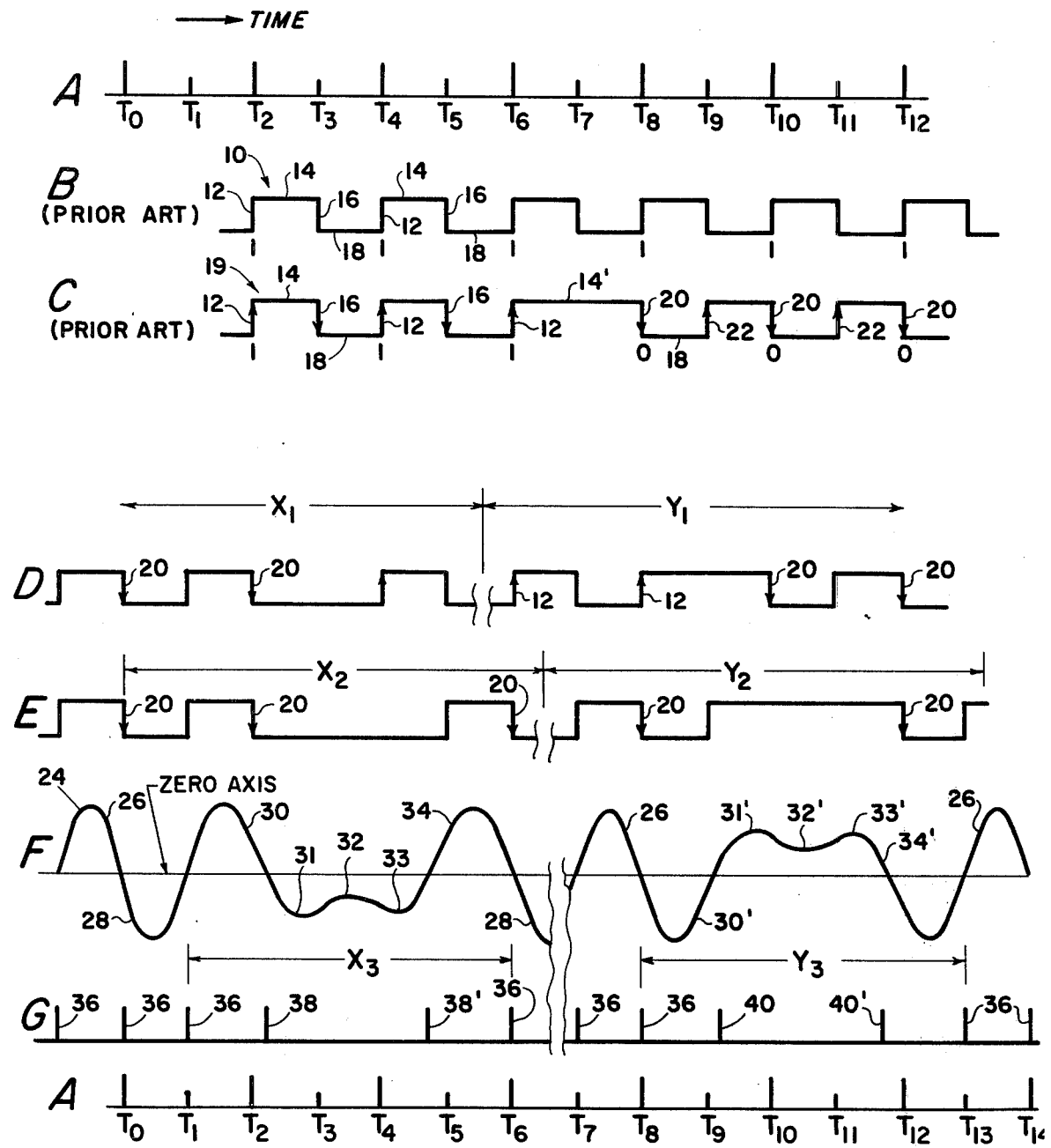
FIG. 1, consisting of A–G illustrates various wave shapes involved in the design and operation of this invention.

Referring now to the drawings and, in particular, to FIG. 1, there is shown a number of wave shapes involved in digital recording on magnetic tape, with which this invention is concerned. Various time functions are shown labelled "A," "B," "C," "D," "E," "F," "G." The line A represents a time record of times "T0," "T1," "T2," "T3," "T4," "T5," "T6," "T7," "T8," "T9," "T10," "T11," "T12," etc. These are equal intervals of time at which the rising and falling members of the square waves, such as shown in line B, are examined.

DESCRIPTION OF THE MANCHESTER CODING SYSTEM

Line B represents a continuous train of square waves 10 starting from a zero line 18 and at a time T2, rising 12 to a "high" value 14 and the time T3 dropping vertically 16, to the "low" value 18 and again at time T4, rising on the vertical, 12 to the high value 14 and at T5, dropping 16 to the low value 18, etc. At the times marked with even numbers such as T2, T4, T6, etc., a number which may be a 1 or a 0 is positioned under the low value of the square waves. In the Manchester coding system the square wave 10 in line B represents a series of digital 1's at each of the times T2, T4, T6, T8, T10, T12, etc.

Referring now to line C and the time function 19, this is a series of square waves which represents, as shown by the numbers, a series of 1's and 0's. The rise member 12 at the time T2 indicates a digital 1. Similarly, the rise member 12 at T4 again represents a digital 1, etc. Whether the member 12 or 20 is involved is the question of "does the curve 19 enter at a low value and leave at a high value, or does the line center at a high value and leave at a low value?" For example, at times T2, T4 or T6 the rise legs 12 move in the direction from a low to a high value and the curve extends to later times at a high value. This is the definition of a digital 1, at the instants T2, T4, T6, etc. Consider now the times T8, T10, T12. Here the vertical lines 20 enter at a high value and terminate at a low value and the curve progresses to later times at a low value. This condition is defined as a digital 0. In order for the vertical elements of the function 10 to progress to be digital 1's at successive times T2, T4, T6, there must be an intermediate portion of the function where there is a vertical component or phase bit 16 so that the high value 14 can connect with a low value 18 prior to the next rising line 12, for example. These transitions 16 where they drop from a high value back to the low value occur at some intermediate times between the even-valued times T2, T4, T6 and these intermediate or phase times are labelled with odd numbers, such as T3, T5, etc. Thus, for a series of digital 1's, the time function 19 rises to a high value 14 at T2, returns to a low value by number 16 to low value 18 at T3. Again at the even time T4, it is in a position to rise again to a high value, representing a digital 1, returning again at T5 and rising again at T6. If the next digital number is 0, the line 14 stays high for the full interval T6 and T8 and the downward extending line 20 at the even time T8, which departs at a low value 18, signifies a digital 0 and, if the next digit is 0, the line progresses upwardly via number 22 to a high value at T9 so that it will be in position to move downward at an even number T10 by line 20 to a low value 18, etc.

It is seen, therefore, that in the case of a long string of similar bits, such as 1 or 0, there is a uniform progression of square waves, such as shown in line B. When there is a change from a string of digital 1's to a string of digital 0's there is a space which is a full time interval between even numbered time markers.

In the steps of writing and reading these square waves on magnetic tape it is important that when the magnetic tape is read, amplified and differentiated and converted to square waves, the square waves be exactly timed similar to the square waves that were originally recorded on the tape. In the reading portion of a tape unit, a short time interval in the vicinity of the even numbered times T2, T4, T6 is set aside, during which the detector waits for, and senses, the vertical component. It determines whether is is downmoving, or upmoving, such as a 20 or a 12, so that it can determine whether the bit which has been recorded is a 0 or a 1.

Now, as the density of recording bits on the tape increases, that is, the number of bits recorded per inch of tape, the time interval between the even numbered times shown on line A, becomes shorter and shorter. For example, the original recording of square waves representing digital bits used to be a bit density of 200 bits per inch. This was increased until, for a long time, the conventional tape density was 800 bits per inch. Then there was a change to a twice higher density, namely 1600 bits per inch. At the present time instruments are being manufactured and used that have a density of 6250 bits per inch.

As the density of the recording a tape increases, the spacings on the tape of the magnetized areas and the time intervals become smaller, so that a small shift in time of the vertical elements can cause error in reading the tapes. This shift in timing of the vertical elements is known in the industry as "peak shift."

Very little peak shift occurs when there is a continuous equally spaced series of highs and lows such as line B of FIG. 1.

However, when a pattern signal such as shown in lines D and E are used, where there is a wide low between a series of short highs and lows, part of the flux of the adjacent highs spreads into the wide space, and effectively narrows the wide space. Thus, in the read signal the vertical elements in line D at T2 will be delayed and at T4 will be advanced. This shifting of time is representative or illustrative of peak shift.

Since this effect is greatest for the types of patterns illustrated in lines D and E these have been chosen as diagnostic patterns. The composite pattern includes the direct pattern X1 and the reversed pattern Y1, in the case of line D and the direct pattern X2 and the reversed pattern Y2, as in the case of line E.

Refer briefly to line F, where a more or less sinusoidal curve 24 is shown. Prior to the time T0 there is a group of essentially sinusoidal half cycles 26 and 28 leading into the half cycle 30. However, at T2 where the magnetization changes from a high value prior to T2 to a low value for several timed intervals there will be spreading of the flux at T2 so that on playback, the curve 30 will no longer cross the zero axis at the time T2, but at some later time such as 38 shown in line G. Furthermore, since there are no reversals in at times T3 and T4, there is little variation in the curve 24, although there is a slight down and up and down variation leading back to the half cycle 34. Here again, however, the curve at 34 does not pass through the zero axis crossing at time T5 because the unsymmetrical magnetization at that time, where there is a long period of magnetization in one direction followed by a group of essentially sinusoidal half cycles 34, 28, etc. Consequently, the pattern between the times T1 and T6 is a distinctive pattern, which is diagnostic of the peak shift, which is illustrated by the half cycles 30 and 34, which are broader than the spacings T1 and T2. This effect is the "peak shift" that is measured.

In interpreting an output signal, such as 24 of line F, zero axis crossings are detected and a short time pulse or pip 36 is provided at each zero axis crossing and, where there is a uniform sinusoidal signal corresponding to a series of equal square waves of unit timing, the time intervals of the pulses 36 are approximately equal. However, in the vicinity of T2, because of the flux spreading shown on the curve 30, there is a delay in the zero axis crossing indicated by pulse 38. There is a similar advance of the zero axis crossing time at 38 corresponding to curve 34. The amount of time shift between T2 and the crossing 38 is the amount of peak shift and, if it gets broader than a certain allowable maximum value, there is danger that the read system will mistake an upswing for a downswing, or vice versa, and provide an error in the reading of the tape. When this occurs, it is necessary to readjust the tape drive mechanism.

The tape unit manufacturers generally provide one or more adjustments in the head and drive systems so that, by making adjustments in the circuits, they can vary the amount of peak shift and, therefore, compensate for this naturally occurring factor. No effort will be made to describe what is done in the tape units because this is prior art and has nothing to do with this invention and is well known in the art. This invention is only concerned with apparatus by means of which the peak shift can be readily detected and measured and can be done while the adjustment of the apparatus is being accomplished.

One of the objects of the invention is to provide a plurality of standardized patterns, such as X, Y, which can be applied to tape by the write heads, and read off the tape by the read heads and displayed. Each of the patterns comprises two parts—the "X" and "Y" parts, one of which is a reverse signal compared to the other. The reason for this reverse pattern where "X," for example, shifts from a 0 to a 1 and the "Y" pattern shifts from a 1 to a 0, is because there is an initial magnetic bias in the tape itself, which is placed in the tape when it is erased. That is, it has a continuous unidirectional longitudinal magnetization, so that the action of the heads for direct and reverse patterns is not identical and, therefore, it is important that the patterns have two parts, one of which is the reverse of the other.

Also, since tapes are read with the tape moving in either direction, the testing for peak shift must be made with tapes moving both forward and backward.

The lines D and E show slightly different patterns where the interval of the wide portion is two units as in line D and three units as in line E. Since these are two common types of square wave patterns that occur in normal digital recordings and since they commonly involve the presence of peak shift, these types of patterns are used in this invention for testing for peak shift.

Figure 2:
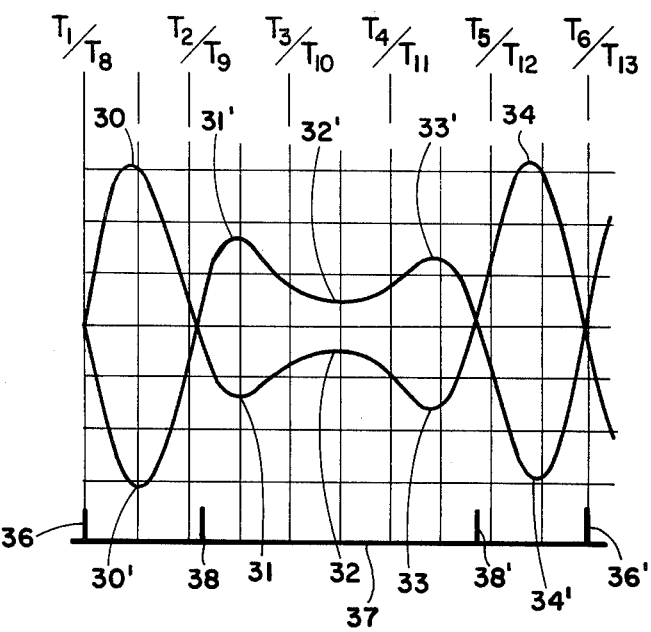
FIGS. 2, 3 and 4 illustrate diagnositic wave shapes appearing on the analog display of the oscilloscope using the tester.
Figure 3:
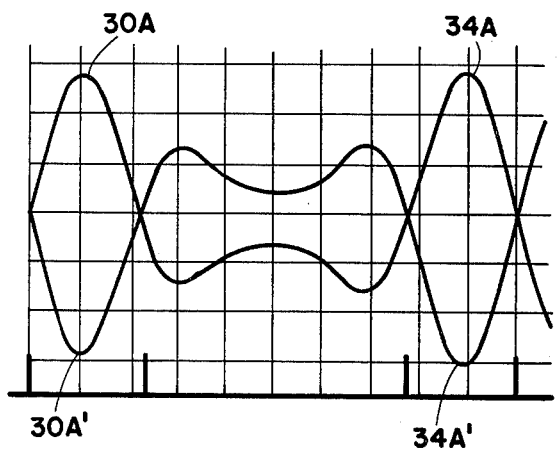
Figure 4:
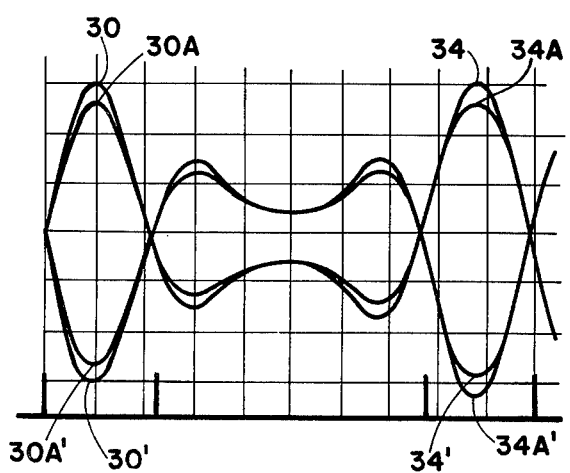

Referring now to FIGS. 2, 3, and 4 there are shown displays of the characteristic patterns "X" and "Y." As will be described in FIGS. 5 and 6, in the display the pattern "X" is recorded as shown in FIG. 2 and then the pattern "Y" is recorded synchronously. Since it is in opposite phase, the resulting pattern is as shown in FIG. 2. Similarly, there are timing pulses as shown on the bottom of the FIGURE, which compare to those in line G of FIG. 1 and, by means of which, the timing error of the peak shift, can be numerically determined.

FIG. 2 illustrates the analog similar to line F of 30, 31, 32, 33, 34 of the direct pattern and the signal 30', 31', 32', 33', 34' of the reversed pattern (superimposed) on each other in synchronism.

In the lower part of FIG. 2 is the pattern shown in G of FIG. 1 with the zero axis crossing pips 36, 38, 38', 36', etc. In this figure, the timing of the direct and reversed patterns were identical when superimposed. However, the peak shift of 30, shown by 38, compared to 36 is clearly seen. Also, 38' compared to 36'.

FIG. 3 shows a similar display as in FIG. 2 with the tape being run in the backward direction, instead of forward as in FIG. 2.

FIG. 4 is a "double exposure" showing superimposed the displayed read patterns of FIGS. 2 and 3 together, indicating points of difference in operation for the different directions of tape movement.

FIG. 4 shows what the patterns would look like and it represents the sums of FIGS. 2 and 3. In other words, the two patterns of FIG. 2 are superimposed on the two patterns of FIG. 3, with the results as shown in FIG. 4.

This points out very clearly any differences or dissymmetries in the action of the tape drive unit and the head system for tape directions forward and backward.

Figure 5:
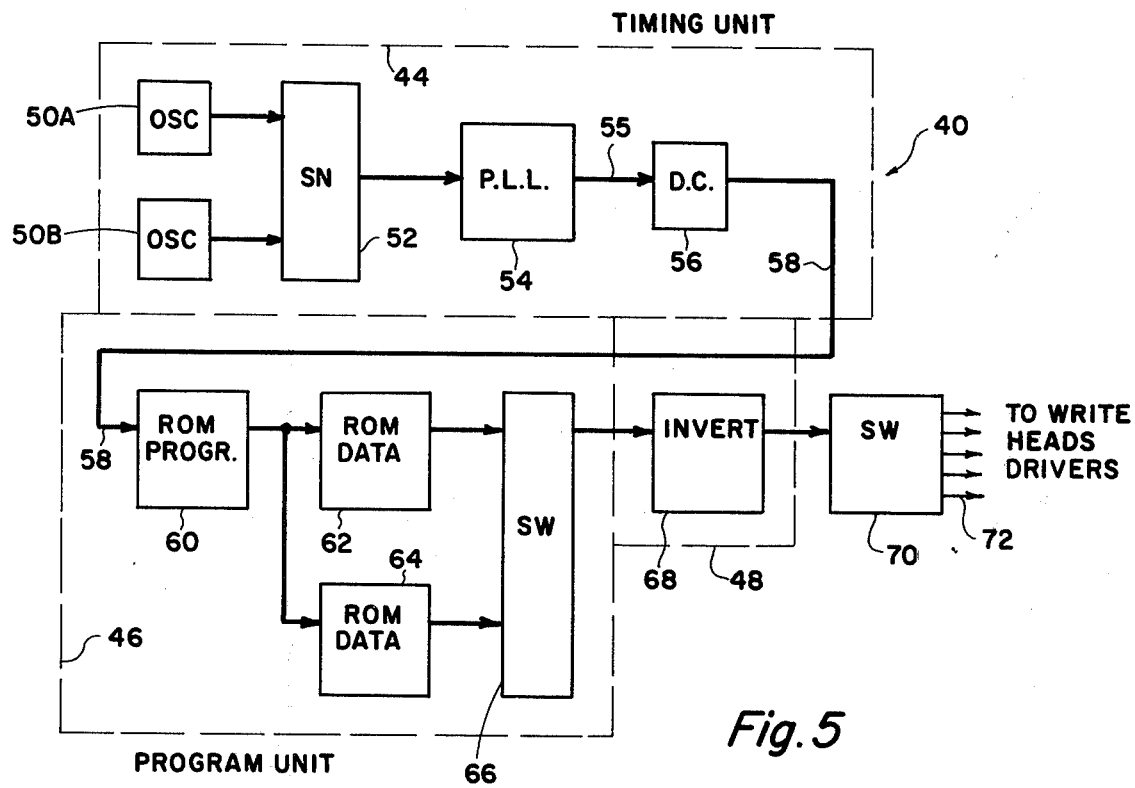
FIGS. 5 and 6 illustrate schematic block diagrams of the write portion of the system and the read portion of the system, respectively.
Figure 6:
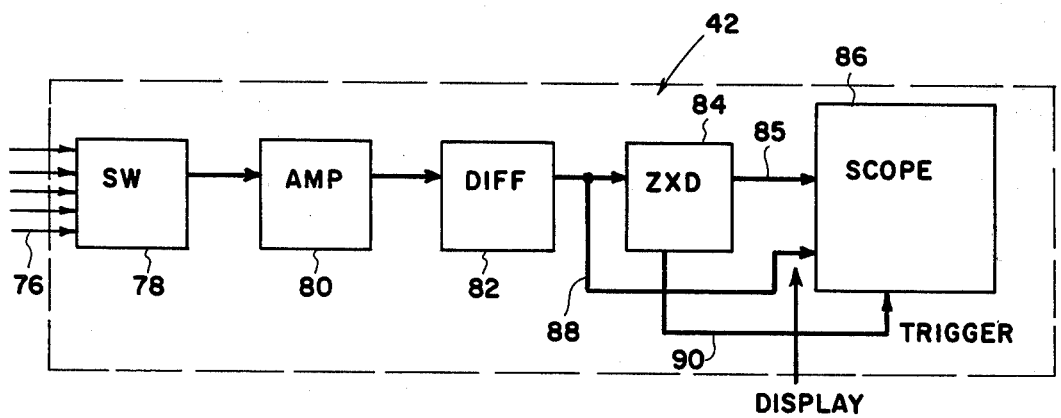

Referring now to FIG. 5, there is shown in block diagram form, the apparatus 40, which provides the write signal to the tape unit. This comprises two principal units, a timing unit 44 and a program unit 46. Since there are many different types of tape units, each of them capable of having tapes run at different speeds and to record at different bit densities, it is important to have a series of frequencies of timing available, in order to generate the write (and read) clocks.

The timing unit enclosed in the dashed outline 44 includes two oscillators 50A, 50B, which are set on specific selected frequencies, so that one or the other can be switched in by unit 52 to a phase-lock loop 54. The output of the phase-lock loop on lead 55 provides signals of a plurality of selected frequencies and these can be varied further by a dividing counter 56 so that, on lead 58, there will be a selected set of standardized frequencies. This signal on lead 58 goes to the program unit inside the dashed outline 46. There are a plurality of read-only memories (ROM) one of which 60 includes the program of the operations, which sends appropriate signals to one or the other of two data ROMS 62, 64. In other words, the data ROMS will have the bit sequences, such as indicated in lines D and E of FIG. 1, so that the proper bit pattern can be provided, to be written on the tape. Either of the two data ROMS 62 and 64 are selected by switch 66 and this signal goes to an inverter 68 where the pattern is first not inverted and then later is inverted, to provide the direct and reverse patterns. The output of the inverter then goes to a switch 70 where it can be applied selectively to any one or more of the recording heads through appropriate head drivers, not shown, but well known in the art.

Each tape unit generally has a write head and the tape then moves past a read head, so that the data which were just previously written, can be read and checked for errors. The read heads have outputs indicated by arrows 76 of the read system 42 of FIG. 6. These signals go to switch 78, so that any one of the head driver outputs can be read. The output of switch 78 then goes to an amplifier 80 and to a differentiator 82, to provide an analog signal similar to that on line F of FIG. 1. The output of the differentiator goes to a zero axis crossing detector 84, which provides the pips, or sharp pulses of line G, which are designed to occur wherever the analog curve, such as 24, crosses the zero axis. The zero axis crossing detector has two outputs, one of which on line 90 goes to trigger the sweep of the oscilloscope or scope so that it starts at a selected time, such as T1, for example, or any selected time in accordance with the pipes 36 of line G. The output of the zero axis crossing detector also goes as a signal over line 85 into the scope to provide a track such as that shown in line G, for example.

The signal from 82, which is the analog pattern, such as on line F, goes by lead 88 to the scope and is displayed. The scope is triggered once at time, say T1, and displays to time T6. There is then a selected interval after which the patterns, such as D or E, are repeated again, in reverse polarity. That is, the signals are inverted. The scope is then triggered again at time T8 and the sweep turned off at T13, for example. These two patterns, since they are triggered synchronously, overlap and appear, as in FIG. 2. The pattern signal from FIG. 5 is constantly repeated and written on the tape, read off the tape and displayed, as in FIG. 6. Thus, the scope display will be a stationary pattern, showing the direct and inverted analog signals read from the tape as shown in FIG. 2.

These displays are very important because the character of the signal can be evaluated. For example, if the amplitude of the signal going to the write head is too great, there will be a distortion in the magnetization of the tape and the read signal will be distorted (peak shift). This will be readily discernible, so that the operator can adjust the equipment and provide a suitable signal to the write heads. Conversely, if the signal level is too low, then the operator can determine that it should be raised and that can readily be done, etc.

What has been described is an apparatus for and a method of testing a magnetic tape unit, in which a specific selected set of square wave patterns is applied on a repetitive basis, to the tape write heads, the signals generated in the read heads and processed and displayed on a continuing repetitive basis, with synchronous triggering of the scope, so that a static pattern is provided, which is diagnostic of the amount of peak shift in the tape unit. This pattern is immediately responsive to the change of adjustment of the tape unit so that it can be used as a monitor to determine when the tape unit is properly adjusted.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. Apparatus for testing a tape drive unit having at least one write head, one read head, and a tape; and at least one adjustment means of the tape mechanism, to effect a change in peak shift or waveform, comprising:
   (a) means for generating a selected composite pattern of square waves, including a direct pattern and a reversed pattern; and means for repetitively writing said composite pattern on said tape;
   (b) means for reading the repetitions of said composite pattern from the said tape, and amplifying and differentiating the signal from said read head, to provide a read signal, and means to apply said read signal to an oscilloscope for display;
   (c) means to trigger the sweep of said oscilloscope at a selected time in said read signal for each of said direct pattern and said reversed pattern, of said composite pattern;
   whereby analog pattern signals will be displayed on the oscilloscope screen for the critical parts of both the direct and reversed portions of said composite pattern;
   whereby changes in the displayed pattern can be observed for specific changes made in said adjustment means of said tape unit.

2. The apparatus as in claim 1 and including:
   (d) means to create a pulse at each zero axis crossing of said read signals, and to display said pulses;
   whereby the time shift of said zero axis crossing pulses at selected times in said read signal, for each said direct and reversed portions of said pattern, can be determined.

3. The method of testing a magnetic tape unit comprising:
   (a) generating a selected composite pattern of digital ones and zeros;
   (b) repetitively applying said selected pattern to at least one write head of said tape unit;
   (c) reading by a read head the recorded magnetic pattern on said tape of said composite pattern as written by said write head;
   (d) amplifying and differentiating the output of said read head, to provide an analog read signal and sending said analog read signal to the display terminal of an oscilloscope;
   (e) determining the zero axis crossing times of said read signal and generating short time pulses at each zero axis crossing time, and sending the pattern of said short time pulses to the display terminals of said oscilloscope;
   (f) triggering the sweep of said oscilloscope; synchronously with said pattern;
   whereby said read analog signals and said patterns of pulses will be continuously displayed on said oscilloscope.

4. The method as in claim 3 in which said composite write pattern comprises a direct portion and an inverted portion, separated in time and space on said tape, each part being the reverse of the other, and separately triggering the sweep of said oscilloscope for each of said direct and inverted pattern, whereby the direct and inverted read signals will be simultaneously displayed in superimposed position on said oscilloscope.

* * * * *